(No Model.)

I. G. MARSTON.
TABLE TOP FOR CIRCULAR SAWS.

No. 401,894. Patented Apr. 23, 1889.

Witnesses.
J. H. Wister
E. B. Whitmore.

Inventor.
Irving G. Marston
by Wm H Babcock
Attorney.

UNITED STATES PATENT OFFICE.

IRVING G. MARSTON, OF BOSTON, MASSACHUSETTS, ASSIGNOR TO I. G. MARSTON & CO., OF SAME PLACE.

TABLE-TOP FOR CIRCULAR SAWS.

SPECIFICATION forming part of Letters Patent No. 401,894, dated April 23, 1889.

Application filed December 27, 1887. Serial No. 259,167. (No model.)

*To all whom it may concern:*

Be it known that I, IRVING GILL MARSTON, a citizen of the United States, residing at Boston, in the county of Suffolk and State of Massachusetts, have invented a new and useful Table-Top for Circular Saws, of which the following is a specification.

The especial object of my invention is to produce a table-top for circular saws, so contrived that the opening or slot in the table through which the saw works, and the guides which carry the work to the saw, can be easily adjusted to a plane parallel with the rotation of the saw, or, in other words, perpendicular to the saw-arbor, and to accomplish this adjustment in a simple and effective manner with the least possible expenditure of time and skill in so doing. I attain these objects by the mechanism illustrated in the accompanying drawings, in which I have shown it as applied to a saw operated by hand and foot power.

Figure 5:
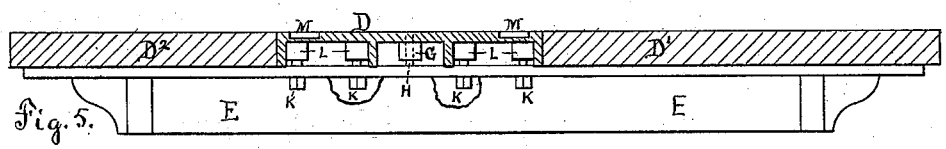
Figure 4:
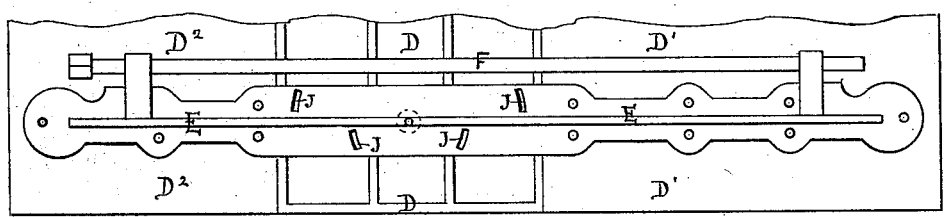
Figure 2:
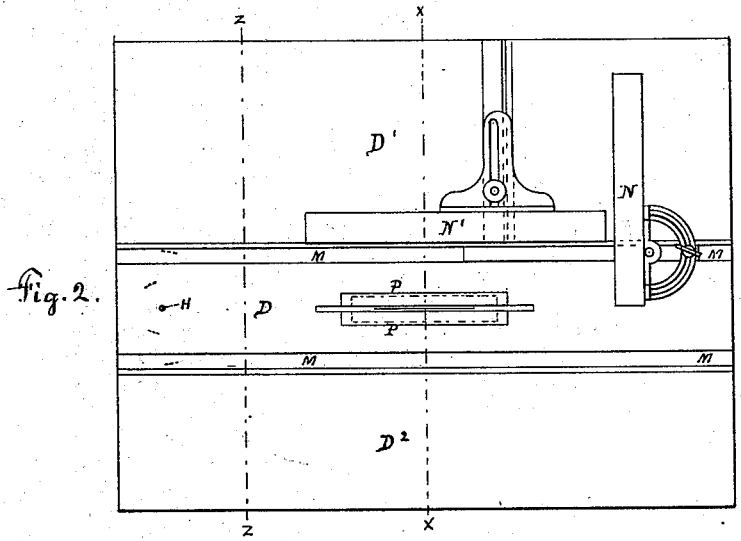
Figure 3:
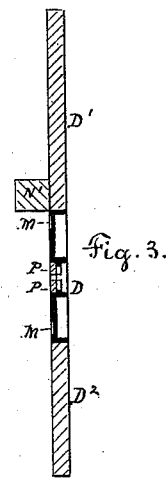
Figure 1:
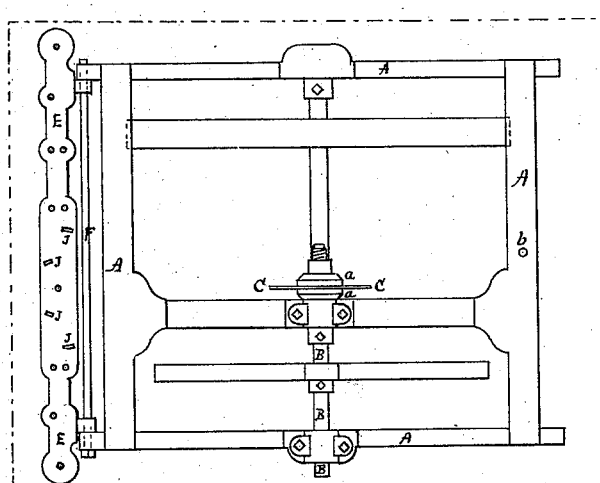

Figure 1 is a plan of the table with the top removed; Fig. 2, a plan of the table-top; Fig. 3, a section of the table-top on the line $x\,x$; Fig. 4, a view of the under side of the end of the table-top; Fig. 5, a section of the table-top on the line $z\,z$.

A represents the frame of the table carrying an arbor, B, on which is secured, by means of clamps $a\,a$, a circular saw, C. The top of the table is made in three parts, D, D', and D², the part D of metal—and the one to which my invention particularly refers—the others being of wood. These three parts are secured to a ribbed bar, E, and hung on the rod F to the frame A. From a projection, G, on the under side of the part D, a pin, H, extends into and is pivoted to the bar E as nearly as possible in a line with the saw-blade. Slots J, through the bar E, admit set-screws K to engage with projections L on the part D.

Grooves M are cut in the surface of the part D to serve as ways for the guide N, which presents the work to the saw across the line of its rotation, and it is requisite that the guide should move parallel to the line of the saw in order to produce good results. A guide, N', moves for adjustment in the part B' in a direction parallel to the grooves M to keep the work in a line parallel to the rotation of the saw.

As it is a matter of time and skill to arrange these parts so that the grooves M shall be exactly at right angles to the saw-arbor by laying the plate D and bar E upon the frame, then marking the points of contact, boring, and fitting screws in their proper places, I have arranged the mechanism as above described, so that all which is needful for a proper adjustment of the parts is to place the pivot H in position in the bar E, vibrate the part D until it comes to the proper position relative to the saw, and secure it in place by the set-screws K—an operation requiring little time or skill. When the central portion of the table-top is thus fitted to the frame, the wooden parts D' and D² are screwed to the bar E, forming the completed top. A similar bar to the bar E, but in which the slots are not required, holds together the other end of the table-top. The groove in the central portion of the top part, D, in which the saw runs, is necessarily made wide to allow the use of a bunch of saws or a wabbling saw for grooving purposes, and when not in such use, I insert on each side of the saw and close to it a wooden strip, P, secured to the top by screws from the under side to bear up the work, which strips are removed when it is desired to wabble the saw or to use a bunch of saws. These strips, being of wood, have the further advantage of not injuring the saw if they impinge upon it during the process of adjustment. A screw passes through the frame at $b$ to raise and lower the free end of the table-top.

I claim as my invention—

In the table-top of a circular-saw mechanism, a metallic center piece extending the length of the table having a slot for the saw, and grooves for guides to present the work to the saw, the same being adapted to adjust the grooves on a line with the saw by means of a pivot and set-screws, as described.

IRVING G. MARSTON.

Witnesses:
CHAS. F. SLEEPER,
L. M. MARSTON.